Dec. 9, 1924.　　　　H. H. BOYCE　　　　1,518,896
TEMPERATURE INDICATING INSTRUMENT FOR MOTOR VEHICLE RADIATORS
Original Filed June 20, 1914
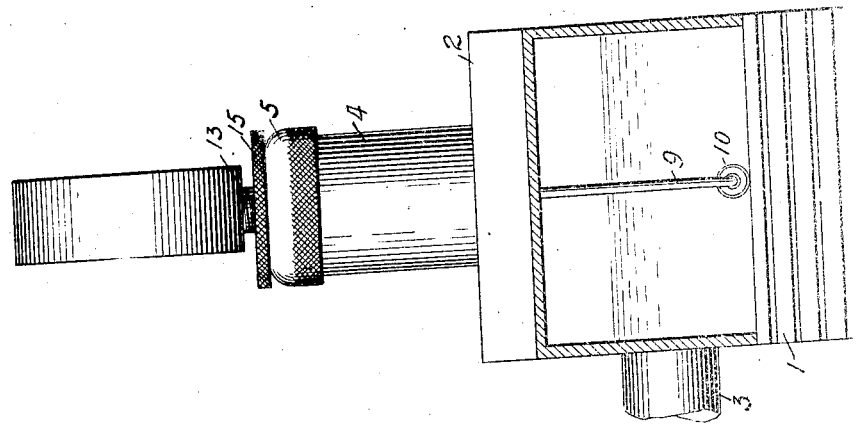
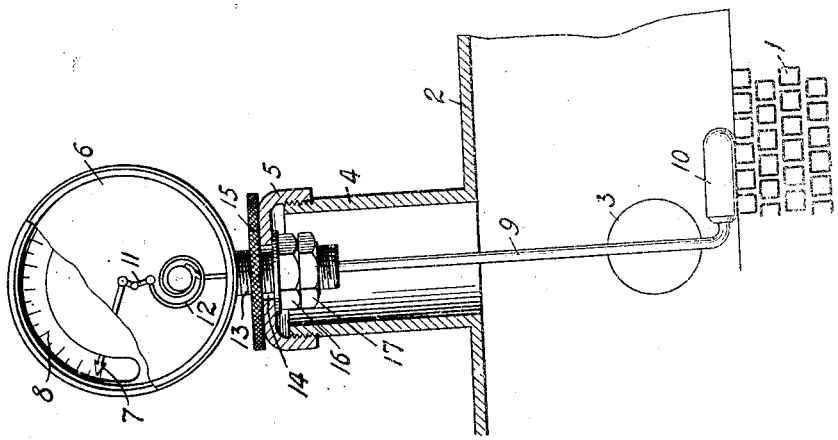
INVENTOR
Harrison H. Boyce
BY
Edmund Quincy Moses
HIS ATTORNEY Patented Dec. 9, 1924.

1,518,89

UNITED STATES PATENT OFFICE.

HARRISON H. BOYCE, OF FOREST HILLS, NEW YORK.

TEMPERATURE INDICATING INSTRUMENT FOR MOTOR VEHICLE RADIATORS.

Original application filed June 20, 1914, Serial No. 846,247. Divided and this application filed February 20, 1919. Serial No. 278,223.

*To all whom it may concern:*

Be it known that I, HARRISON H. BOYCE, a citizen of the United States, residing in Forest Hills, county of Queens, and State of New York, have invented certain new and useful Improvements in Temperature Indicating Instruments for Motor Vehicle Radiators, of which the following is a specification.

This invention relates to means for indicating the thermal condition of internal combustion vehicle propelling engines, such as are used on automobiles or other vehicles. Such engines are commonly provided with water circulation cooling systems including radiators into which the heated water from the engine cylinder jackets is discharged at the upper part of the radiator, passes down through the radiator, giving up its heat meanwhile to the air passing through the radiator tubes, and when finally cooled is returned from the lower part of the radiator to the engine jackets.

In my Patent No. 1,090,776 I have indicated the desirability for an instrument for indicating the operating condition of such an engine and have pointed out some of the results obtainable and advantages incident to the use of an instrument for this purpose. I have also disclosed in said patent a means for indicating the thermal condition of the engine characterized by the use of instrumentalities having a temperature responsive element so located and organized in connection with the engine cooling system as to be influenced by temperatures existing in a space above the normal level of the water in the cooling system, said space being preferably in the upper part of the radiator or in the radiator filler spout, above the water level.

In most cases, especially in automobile practice, this mode of securing an indication of engine conditions is highly satisfactory and to be preferred to any other, but in certain instances it is desirable to provide an instrument adapted to show the actual water temperature in the radiator and accordingly having a temperature responsive element normally submerged in the water and responding directly to water temperatures. Such an instrument will find particular utility in making certain kinds of tests.

It is furthermore desirable that such an instrument shall be of general application and capable of use upon radiators of various types and designs so as to avoid the necessity of a special construction of instrument for each make or design of radiator.

It is also desirable to have the temperature responsive element located at the lowest practicable point in the upper part of the radiator, preferably directly above the bank of tubes therein, so as to permit the greatest possible variation in the water level within the radiator to occur without exposing the temperature responsive element and so rendering the instrument inaccurate as an indicator of actual water temperatures. It is well known that radiators vary greatly in dimensions and particularly in the dimensions of the top tank or space in the radiator above the bank of tubes and it is also well known that the water level in the radiator is not constant but varies considerably under the conditions of use and is often permitted to fall considerably below the top of the radiator. These conditions must be provided for in an instrument designed for general application to radiators and intended to indicate at all times so far as possible the actual temperature of the water within the radiator.

It is the object of the present invention to meet these conditions by the provision of an instrument having a temperature responsive element connected to the indicating part of the instrument by flexible means depending into the radiator so that the temperature responsive element will normally find the lowest practicable level in the radiator and which also is capable of more ready introduction fully into the radiator in constructions where baffle plates or other obstructions are located in the upper part of the radiator as occurs in many cases.

A further object of the invention consists in the provision of improved means for mounting the instrument so as to facilitate its mounting on a removable radiator cap without interfering with the removability of the latter.

In the accompanying drawings, in which I have shown one preferred embodiment of the invention as illustrative of the principle thereof and the best mode now known to me for practicing the same, Figure 1 is a face view of one form of the instrument showing the same mounted upon the filler cap of a radiator and illustrating the upper part of the radiator and filler spout in vertical section.

Figure 2 is a side elevation of the construction shown in Figure 1, a part of the radiator being shown in section.

Referring to the drawings in detail, these show the form of the invention selected for illustration as applied to a conventional form of radiator, such as is used upon automobiles. A fragment of the upper part of the radiator only is shown, the radiator having the usual bank of tubes 1 surmounted by a casing section 2, commonly referred to as the top tank. The top tank comprises the space for the reception of the heated water from the engine which enters the tank in the usual manner through a return pipe 3, the water being distributed in the top tank over the bank of tubes and passing downwardly through the narrow passages around the tubes so as to be cooled. For the purpose of filling the radiator, a filler spout 4 is located on the top tank in the usual manner, this spout being closed by a removable cap 5 shown as screwing on the threaded upper end of the filler spout. In the ordinary use of a radiator the water level will normally stand somewhere in the top tank above the top of the bank of tubes, the exact point being variable and the level frequently falling well down towards the top of the tubes, a condition which may exist in many cases without interfering with the proper operation of the cooling system.

The means illustrated for indicating the temperature of the water in the radiator comprises a gage or indicating part 6 mounted on top of the radiator cap and having an indicating device such as an indicating hand 7 adapted to move over a scale 8, the instrument also having a temperature responsive element such as the flexible tube 9 terminating in a bulb 10 depending into the upper part of the radiator. The tube 9 should be made of such length that it will extend well down into the top tank of a radiator having the greatest tank depth likely to be met with in practice, so that it will be submerged in the water even when the level of the latter falls nearly down to the top of the tubes. Preferably the length of the tube 9 should be such that the bulb 10 will actually reach or rest upon the tubes.

The instrument illustrated is an instrument of the liquid expansion type in which the pointer 7 is connected by a suitable linkage 11, which may be of any of the types commonly employed in gages, with a flattened tube or Bourdon spring 12 of usual construction, this spring, the tube 9 and the bulb 10 being filled with a suitable expansible liquid such as alcohol or mercury. Changes of temperature at the bulb 10 cause an expansion or contraction of the liquid therein which is transmitted through the tube 9 to the Bourdon spring 12, causing the latter to unwind more or less and move the indicating hand over the scale 8 so as to indicate the change in temperature. It will be understood that any other suitable type of temperature change indicating means including a flexible depending tube or member may be employed.

The gage 6 is preferably mounted on the radiator cap 5, in such a way that the cap and gage are capable of independent rotary movement for a purpose which will be hereinafter explained. As illustrated the gage has a screw threaded stem 13 which projects through a hole 14 in the radiator cap. Screwing on this stem above the cap and adapted to act as an abutment or shoulder resting on the cap, is manually releasable means such as a disc or nut 15 preferably milled at its periphery so that it may be readily gripped, while on the stem below the cap are screwed a nut 16 and lock nut 17 which may be tightened up together so as to make a substantially immovable shoulder on the stem below the cap. In normal use the disc 15 is screwed down so as to clamp the instrument firmly in position upon the cap. When the cap is to be removed, however, the disc 15 can be unscrewed slightly so as to loosen the engagement between the instrument and the cap, thus permitting relative rotary movement between the instrument and cap and allowing the cap to be unscrewed without turning the instrument. This mode of operation is desirable in instances where the lower portion of the tube is bent over as in the case of radiators with relatively shallow top tanks or where the tube is bent around baffle plates, as it avoids twisting the tube or the necessity of swinging the bulb round and round as the cap is unscrewed. Danger of breakage or injury to the tube and bulb is thus obviated. After the cap is unscrewed it can be removed from the filler spout by simply drawing the tube and bulb up straight out of the filler spout. In the same way when the cap is to be replaced the bulb and tube are lowered into the radiator and the instrument casing held stationary while the cap is rotated to screw it into position. The instrument is then properly turned so as to face the driver's seat and the disc 15 is screwed down so as to clamp the instrument firmly to the cap. Any other suitable construction than that shown for accomplishing this purpose may be employed but the construction illustrated is simple and satisfactory.

By making the tube 9 of sufficient length to permit the bulb, under normal conditions, to dip into the water in radiators where the filler cap is as far above the top of the tubes as is likely to be met with in practice, it is possible to provide an instrument which is interchangeable and adapted to be used on all commercial radiators as the same instrument may be fitted on radiators in which the distance from the filler cap to the top of the tubes is less, by simply inserting the bulb and tube into the radiator and permitting them to bend over to a greater or less extent as may be required.

Owing to the flexibility of the tube 9 the bulb 10 will tend to seek the lowest possible position in the top of the radiator, usually resting directly upon the top of the tubes, thus insuring that the bulb will be immersed and actual water temperatures indicated so long as the water level is higher than the top of the bank tubes.

This application is a division of my application for patent Serial No. 846,247 filed June 20, 1914, Patent No. 1,311,152, dated July 29, 1919.

While I have illustrated and described in detail one preferred embodiment of my invention, it will be understood that changes may be made therein without departing from the scope thereof as indicated by the appended claims so long as the principle of my invention is employed in the structure utilized.

Having thus described my invention I claim:

1. In means for indicating the thermal condition of an internal combustion engine having a water circulation cooling system including a radiator having a bank of tubes, a top tank above the bank of tubes, a filler spout and a cap for closing said spout, the combination with the radiator, filler spout and cap, of an instrument mounted on said cap having a stem projecting through a hole in the cap, releasable means operable from the outside of the radiator for clamping said instrument to said cap, said instrument having temperature-change indicating means including a flexible tube depending into the radiator into proximity to the bank of tubes and adapted normally to extend into the water in the radiator top tank.

2. In means for indicating the thermal condition of an internal combustion engine having a water circulation cooling system including a radiator having a filler spout and a cap for closing the same, the combination with the radiator, filler spout and cap, of a temperature-change indicating instrument mounted on said cap having a thermally responsive part including a flexible element depending from said instrument into the radiator and adapted normally to extend into the water in the radiator, and manually releasable means for clamping said instrument to said cap.

3. In means for indicating the thermal condition of an internal combustion engine having a water circulation cooling system including a radiator having a bank of tubes, a filler spout and a cap for closing the same, the combination with the radiator, filler spout and cap, of an instrument mounted on said cap having a movable indicating member, and means for moving said member including a Bourdon spring, a flexible tube connected with said Bourdon spring and extending into the radiator into proximity to the top of the bank of tubes of the radiator and a bulb carried by the lower end of said tube, said bulb, tube and Bourdon spring being filled with an expansible fluid.

4. In means for indicating the thermal condition of an internal combustion engine having a water circulation cooling system including a radiator having a filler opening and a rotatable closure therefor, the combination with the radiator and closure of an indicating instrument mounted on said closure, and manually releasable means for clamping said instrument to said cap, said instrument including a movable temperature indicating member and means for moving said member including a pressure sensitive element, a flexible tube connected with said element depending from said instrument into the interior of the radiator through the filler opening thereof, and a bulb carried by said flexible tube and adapted to normally extend into the water of the radiator, said bulb, tube and pressure sensitive element being filled with an expansible fluid.

5. In means for indicating the thermal condition of an internal combustion engine having a water circulation cooling system including a radiator having a filler spout and a rotatable cap for closing the same, the combination with the radiator, filler spout and cap, of a temperature indicating instrument mounted on the cap having a stem projecting through a hole in the cap and having a temperature responsive element below the cap, and releasable means operable from above the cap for clamping the instrument firmly to the cap or loosening it with relation to the latter so as to permit the cap to be rotated independently of the instrument.

6. In means for indicating the thermal condition of an internal combustion engine having a water circulation cooling system including a radiator having a filler spout and a rotatable cap for closing the same, the combination with the radiator, filler spout and cap of a temperature indicating instrument mounted on the cap and having a screw threaded stem projecting through a hole in the cap, means carried by the stem forming a shoulder adapted to bear against the under side of the cap and an abutment member having screw threaded engagement with said stem and located above the cap and adapted to be screwed into or out of clamping engagement with the cap.

7. In means for indicating the thermal condition of an internal combustion engine having a water circulation cooling system including a radiator having a filler opening and closure means therefor, including a rotatable element, the combination with the radiator and closure means, of a temperature indicating instrument mounted on the rotatable element and having a temperature responsive element extending into the radiator, and releasable means operable from the outside of the radiator for clamping said instrument to said rotatable element or for loosening it with relation to the latter so as to permit the element to be rotated independently of the instrument.

8. In a system for indicating the thermal condition of an internal combustion engine provided with a water circulation cooling system including a radiator, having a filler spout and a cap for closing said spout, the combination with the cap, of a temperature indicating instrument mounted upon said cap having temperature responsive means including a flexible element adapted to extend as far as practicable into the radiator when the cap is positioned upon the filler spout.

9. In a system for indicating the thermal condition of an internal combustion engine provided with a water circulation cooling system including a radiator, having a filler spout and a cap for closing said spout, the combination with the cap, of a temperature indicating instrument mounted upon said cap having temperature responsive means including a flexible element adapted to extend into the water in the radiator when the cap is positioned upon the filler spout, and manually releasable means for clamping said instrument to said cap.

10. In a system for indicating the thermal condition of an internal combustion engine provided with a water circulation cooling system including a radiator, having a filler spout and a cap for closing said spout, a temperature indicating instrument adapted to be mounted upon the cap having temperature responsive means adapted to extend below the cap, and releasable means operable from above the cap adapted to clamp the instrument firmly to the cap or to loosen it with relation to the latter so as to permit the cap to be rotated independently of the instrument.

11. In a system for indicating the thermal condition of an internal combustion engine provided with a water circulation cooling system including a radiator, having a filler spout and a cap for closing said spout, a temperature indicating instrument adapted to be mounted upon the cap having flexible temperature responsive means adapted to extend below the cap, and releasable means operable from above the cap adapted to clamp the instrument firmly to the cap or to loosen it with relation to the latter so as to permit the cap to be rotated independently of the instrument.

12. In a system for indicating the thermal condition of an internal combustion engine provided with a water circulation cooling system including a radiator, having a filler spout and a cap for closing said spout, the combination with the cap, of a temperature indicating instrument mounted upon said cap and having temperature responsive means including an element adapted to extend into the radiator and normally dip into the radiator water when the cap is positioned upon the filler spout, said element being constituted for adjustment to enable its operative positioning in the radiator.

13. An indicating device for automobiles comprising means adapted to be disposed in temperature responsive relation to the water of a cooling system, operatively associated indicating means adapted to be influenced by the temperature of the water on said first mentioned means, and securing means for operatively assembling the device with a removable closure of said system, the first mentioned means being constituted for adjustment to enable its operative positioning in radiators of varying tank characteristics.

14. A temperature indicator for radiators of automobiles, comprising temperature responsive means adapted to be inserted into the water space of a radiator and provided with means of attachment to the radiator cap, and indicating means operatively associated with said temperature responsive means, said temperature responsive means being of a character to be self-adjustable as to position when engaged with the radiator structure upon inserting the same into the water space of the radiator.

15. A temperature indicator for automobile radiators, comprising a temperature responsive device adapted to be inserted into the water space of a radiator having means for attachment to a radiator cap, said temperature responsive device being of a character to maintain any position of adjustment, but capable of forced deflection to various positions of adjustment.

16. An indicator for automobile radiators, comprising a radiator cap adapted to also constitute an attaching means for the indicator, temperature responsive means connected to be carried by the cap and capable of being positioned in the radiator in angular relation to its line of insertion through the opening to be closed by the cap, indicating means on the cap influenced by the temperature of the temperature responsive means, and means enabling release of the cap while maintaining its connection with the temperature responsive means and without necessitating shifting of the temperature responsive means from its angular position.

HARRISON H. BOYCE